Figure 1:
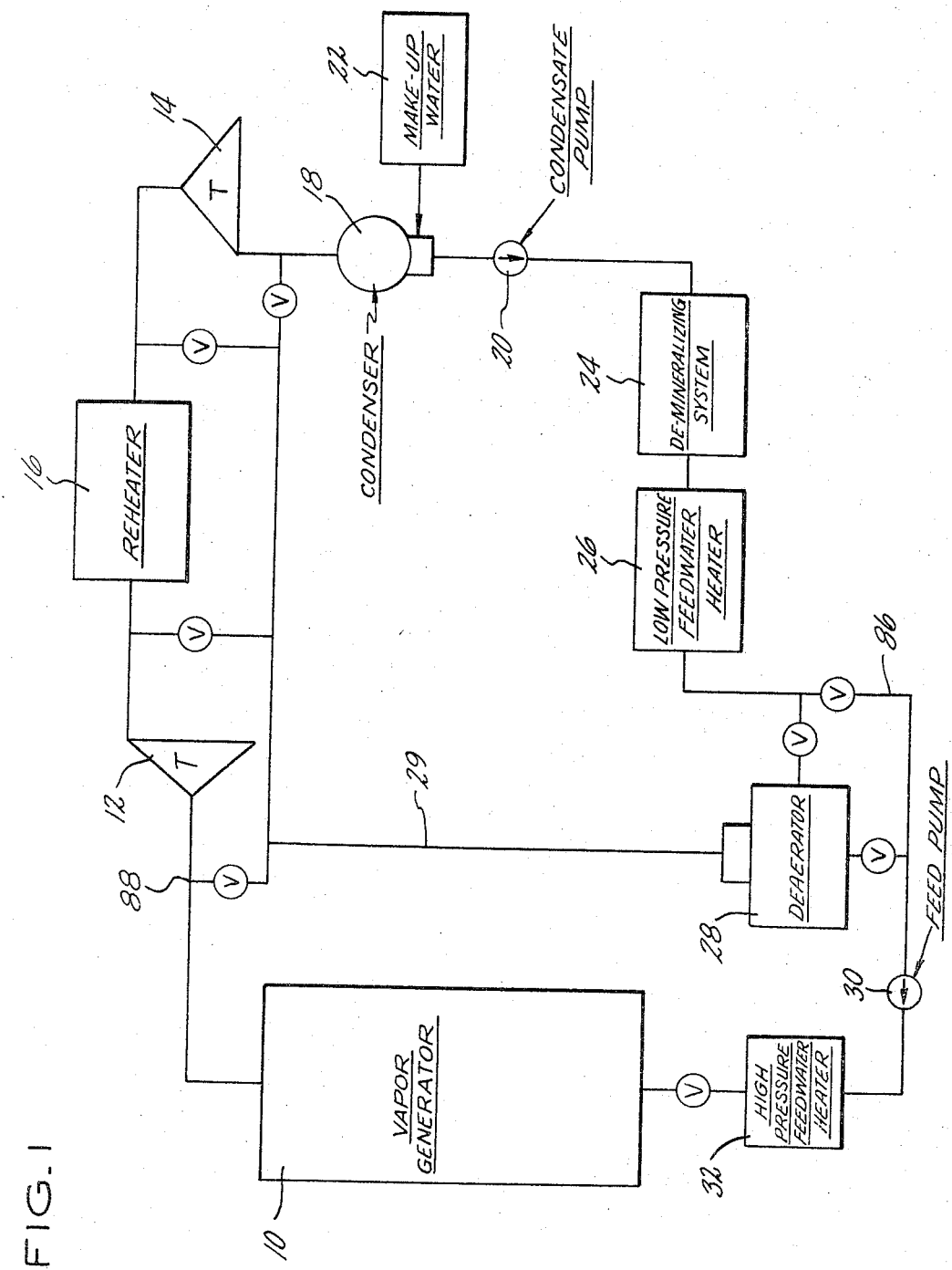

April 4, 1967 R. C. ULMER ET AL 3,312,616
WATER TREATMENT
Filed June 1, 1964 3 Sheets-Sheet 3

INVENTORS
RICHARD C. ULMER
JOHN J. KURPEN
BY Richard H. Berneike
ATTORNEY 3,312,616
WATER TREATMENT
Richard C. Ulmer, Simsbury, and John J. Kurpen, Thompsonville, Conn., assignors to Combustion Engineering, Inc., Windsor, Conn., a corporation of Delaware
Filed June 1, 1964, Ser. No. 371,344
8 Claims. (Cl. 210—26)

The present invention relates to the treatment of water for the removal of both dissolved solids and dissolved oxygen and more particularly to the use of treated ion exchange materials for the removal of both solids and oxygen particularly during start-up of a boiler when conventional deaerators may be inoperative.

In the operation of boilers, it is desirable and often necessary to remove not only the dissolved solids from the water but also to remove the dissolved oxygen. Such materials in boiler water can cause serious corrosion and deposit problems. Most modern steam generating plants and particularly those having once-through boilers utilize demineralizing equipment to remove the dissolved solids and steam deaerators to remove the dissolved oxygen. Oxygen becomes less soluble as the water temperature is increased so that it is easily removed by bringing the water to a boil. In a steam deaerator the water is broken up into a spray or film and then swept with steam to force out dissolved gases such as oxygen and carbon dioxide. Since steam is available during boiler operation, such a method of oxygen removal is practical and economical. However, during start-up of the boiler, steam is not available from the boiler itself for deaerator operation. Therefore, unless an auxiliary steam supply is provided, the deaerator will not function. Provision of an auxiliary steam supply would in many cases be very costly. It is this problem to which the present invention is directed.

An object of the present invention is, therefore, to provide a system from the removal of both dissolved solids and gases from water.

It is a further object to provide a system for oxygen removal when conventional deaeration equipment is inoperative.

A particular object of the invention is to utilize the already existing demineralizing system for both oxygen and solids removal.

Other objects and the attendant advantages will become apparent from the description of the invention which follows.

The present invention is primarily directed to the removal of the dissolved oxygen from the water during start-up when steam is not available by activating the already available ion exchange materials for oxygen removal as well as for solids removal.

Systems have been employed in the past wherein ion exchange resins are treated so that they will remove oxygen from water. One such system is described in an article by Mills and Dickinson in the December 1949, issue of Industrial and Engineering Chemistry on page 2842 entitled "Oxygen Removal From Water by Amine Exchange Resins." In such a system the resin is treated with cupric sulphate and then with sodium hydrosulfite to reduce the cupric ion to metallic copper. The copper then is oxidized by the dissolved oxygen in the water and the dissolved oxygen thereby removed from the water. However, resins treated in this manner do not retain their ion exchange capacity and thus remove only the oxygen from the water while leaving the solids.

Another system for oxygen removal and the one forming the basis for the present invention is described in an article by Potter and Whitehead entitled "Continuous Removal of Dissolved Oxygen by Established Ion Exchangers," appearing in the Nov. 7, 1957, issue of Journal of Applied Chemistry. In this oxygen removal system the resin supports an insoluble deoxygenating substance precipitate within the pores of the resin matrix. Suitable substances to precipitate in the resin are ferrous or manganous hydroxide each of which reacts extremely rapidly with the dissloved oxygen in water. The resin, whether cationic or anionic, retains its capacity for ion exchange.

Considering first the conversion of a strongly acidic cationic resin into the deoxygenating state, a conventional resin such as Zeo-Karb 225 (trade name of Permutit Co., Ltd., England) is treated with strong ferrous (or manganous) sulfate solution which converts the resin from its initial hydrogen or sodium form to the ferrous (or manganous) form. The resin in this latter form is then activated with a solution of a soluble alkali such as sodium hydroxide. The resin itself is thereby converted to the alkali form and ferrous (or manganous) hydroxide is precipitated within the resin. If sodium hydroxide has been used the activated resin will be in the sodium form and in such a state can be utilized to both deoxygenate and soften water in a single continuous process. However, the cations cannot be totally removed from the water since the resin is not in the hydrogen form.

An anionic resin may be converted to the deoxygenating form by treating the hydroxyl form of the resin with a strong ferrous (or manganous) sulfate solution which will convert the resin to the sulfate form with ferrous (or manganous) hydroxide precipitated within the resin pores. Such a resin will deoxygenate water and exchange the sulfate for anions in the water but since the resin is in the sulfate form the anions cannot be totally removed. Deoxygenating resins such as those formed by the process as outlined in the Potter and Whitehead article are utilized in a novel manner in the present invention.

Since oxygen removal by the use of steam operated deaerators is an economical method of operation, the present invention does not suggest the complete substitution of such equipment but rather the provision of auxiliary oxygen removal means for use only when the deaerator is inoperative. The present invention therefore utilizes the existing ion exchange apparatus modified to facilitate oxygen removal in conjunction with the steam operated deaerator. The ion exchange materials are regenerated and activated for oxygen removal for use during start-up and then after the steam deaerator becomes operative, the exchange materials are utilized for demineralization as usual. Such a system and method of operation provides oxygen removal during start-up with a minimum capital expenditure.

The teachings of Potter and Whitehead in the above-mentioned article are extended and modified by the present invention so that ion exchange resins can be effectively used to remove both solids and dissolved oxygen simultaneously. The cation and anion resins mentioned in the article are left in the sodium and sulfate form, respectively, and therefore the resins cannot be utilized for demineralization. The anion resin can be treated with sodium hydroxide after activation with ferrous sulfate to convert the resin back to the hydroxyl form thus permitting the anion resin to remove anions from the water as well as remove oxygen. The present invention also combines a novel scheme for converting the cation resin to the hydrogen form as well as the anion resin to the hydroxyl form so that both resins will demineralize as well as deoxygenate.

The cation resin of Potter and Whitehead is in the sodium form after activation. It cannot be converted to the hydrogen form by the use of conventional acids since such acids would react with the precipitated hydroxide in the resin pores. However, the sieve action of the ion exchange resins can be utilized to advantage in this regard. If high molecular weight acids which have large size anions are employed to convert the cation resin to the hydrogen form, the large anions will not enter the resin pores and thus they will not be available to react with the precipitated hydroxide. Examples of such acids are ligninsulphonic acids and pectic acid. The ligninsulphonic acid is obtained by ion exchange techniques from waste sulphite pulping liquor while the pectic acid is produced from pectin which is derived from fruit rinds. The ligninsulphonate anion, for instance, is too large to enter the pores of the resin and react therewith while the hydrogen ion is available to exchange with the sodium ion on the cation resin. After treatment with such acids, the cation resin will be in condition to remove both oxygen and cations from the incoming water.

Figure 2:
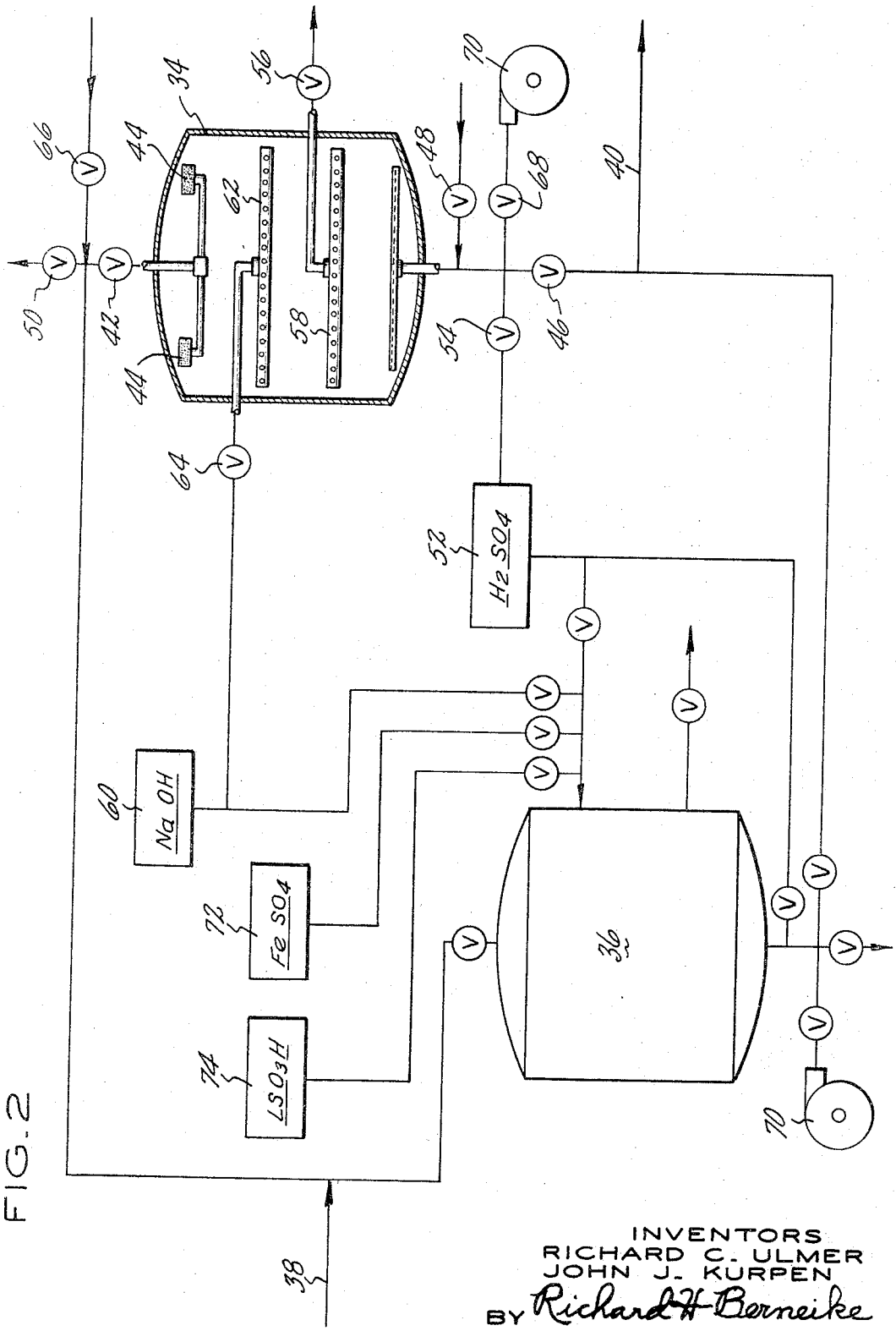
Figure 3:
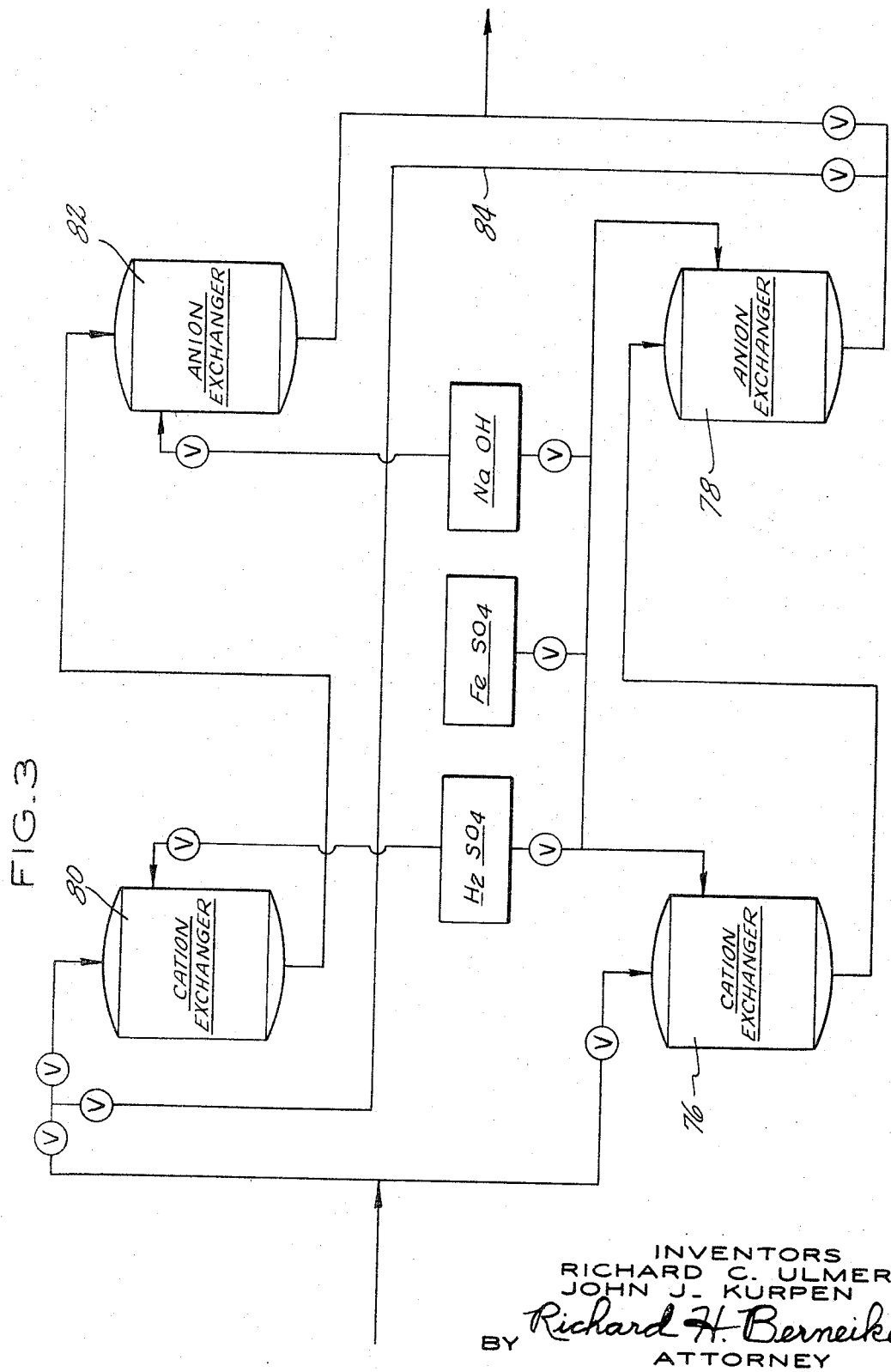

Another favorable aspect of the use of acid with extremely large anions is that they may be utilized to convert the cation resin in the manner described above in a mixed bed exchange unit without separating the anion and cation resins without materially effecting the anion resin. The ligninsulphonate anion, for instance, will exchange very slowly with the anion resin and the practical effect will be that no significant exchange takes place. Therefore, ligninsulphonic or pectic acid or some similar large molecular weight acid can be added to a mixed bed of cation and anion exchange resins to convert the cation resin to the hydrogen form without affecting the anion resin thereby leaving it in the hydroxyl form. Also, the acid will not effect the precipitated hydroxide in either resin since the anion of the acid is too large to enter the pores of the resin matrix and thus cannot reach the hydroxide. For a better understanding of this invention reference may be had to the accompanying drawings wherein:

FIG. 1 schematically illustrates a vapor generating cycle in which the present invention will be employed;

FIG. 2 illustrates a mixed bed demineralizing system incorporating the present invention; and FIG. 3 schematically illustrates an alternative arrangement for the demineralizing-deoxygenating system.

FIG. 1 shows a vapor generating system including a vapor generator 10 which supplies steam to turbines 12 and 14. Between the turbines 12 and 14 is a reheater 16 which serves to raise the steam temperature and pressure to the desired values for use in the second turbine 14. The steam after passage through turbine 14 is condensed in condenser 18 and recirculated through the system by condensate pump 20. Make-up water from supply means 22 is introduced into the system to replenish any losses which have occurred. From the condensate pump the water flows through a demineralization system 24, a low pressure feedwater heater 26 and then to the deaerator 28. The deaerator as previously discussed required steam for its operation. As shown in FIG. 1 this steam may be derived from any one of several locations via line 29 depending upon the temperature and pressure of the steam desired and the conditions existing at the various locations. The deaerated water then passes through feed pump 30 and high pressure feedwater heater 32 back to the vapor generator 10. It can be seen that during start-up, steam from the vapor generator will no be available to operate the deaerator 28. The present invention overcomes this problem by the use of a special demineralizing system 24, alternative arrangements of which are illustrated in detail in FIG. 2 or 3.

The system illustrated in FIG. 2 utilizes two mixed bed ion exchange units 34 and 36 which are connected in parallel with each other relative to the feedwater inlet 38 and the water outlet 40. During normal demineralization one of these units would be in a service cycle while the other unit is either on a stand-by basis or undergoing regeneration. In the system illustrated the exchange unit 34 is employed only for demineralization while unit 36 is employed both for demineralization and deoxygenation.

The units 34 and 36 are conventional mixed bed units identical in construction and therefore only the internal construction of unit 34 has been illustrated. The feedwater enters the unit through valve 42 and is distributed by the collector and distributor means 44. The water flows downwardly through the column and the treated water is extracted through valve 46. When it is desired to regenerate the unit 34 the unit is backwashed with water introduced through valve 48 and extracted through valve 50. This backwash will separate the resins into two distinct layers since the lighter anion resin will rise to the top and the heavier cation resin will settle to the bottom. Sulfuric acid is then introduced from supply tank 52 through valve 54 and extracted from valve 56 so that the acid will flow only through the cation resin inasmuch as the interface of the resins is located at the interface collector 58. The anion resin is then regenerated with sodium hydroxide from supply tank 60 introduced through distributor 62 via valve 64 and withdrawn from the column through interface collector 58 and valve 56. In order to prevent sodium hydroxide diffusion into the cation resin, one of two techniques is employed. Either the cation and anion resins are regenerated at the same time or water is introduced into the bottom of the column and withdrawn through the interface collector during anion regeneration. Either of these procedures will provide the upward flow in the cation resin necessary to prevent sodium hydroxide from flowing down through the lower portion of column. The resins are then rinsed with water introduced through valves 8 and 66 and withdrawn through valve 56. After rinsing, the cation and anion resins are mixed by the agitating effect of air forced in through valve 68 by blower 70. The column is then ready for another service cycle.

The construction of column 36 is identical to that of column 34 and during normal demineralization it would be operated alternately with column 34 and regenerated in a similar maner. However, column 36 has been provided with additional connections to facilitate activation of the resin therein for oxygen removal.

Assuming that the cation and anion resins in column 36 are initially in the hydrogen and hydroxyl form, the method of activating the column for oxygen removal is as follows. Ferrous sulfate is added to the column from supply tank 72 through the distributor in column 36 corresponding to the distributor 62 in column 34. The ferrous sulfate flows downwardly through the mixed resins converting the cation resin to the ferrous form and the anion resin to the sulfate form. Ferrous hydroxide will be precipitated within the pores of the anion resin. The reactions in each resin are as follows.

(1) Cation resin:

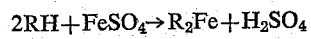
$$2RH + FeSO_4 \rightarrow R_2Fe + H_2SO_4$$

(2) Anion resin:

$$ROH + FeSO_4 \rightarrow R_2SO_4 + Fe(OH)_2$$

Thereafter sodium hydroxide is introduced into the column from supply tank 60 through the distributor 62 from which it flows downwardly through the mixed resins to precipitate ferrous hydroxide in the cation resin and to convert the anion resin to the hydroxyl form. The reactions involved in this step are as follows.

(3) Cation resin:

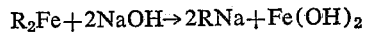
$$R_2Fe + 2NaOH \rightarrow 2RNa + Fe(OH)_2$$

(4) Cation resin:

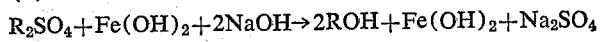
$$R_2SO_4 + Fe(OH)_2 + 2NaOH \rightarrow 2ROH + Fe(OH)_2 + Na_2SO_4$$

To convert the cation resin from the sodium form to the hydrogen form, ligninsulphonic acid, which will be designated as $LSO_3H$, is introduced into the column from supply tank 74. This high molecular weight acid will convert the cation resin to the hydrogen form according to the following reaction.

(5) Cation resin:

$$RNa + Fe(OH)_2 + LSO_3H \rightarrow RH + Fe(OH)_2 + LSO_3Na$$

As previously stated the high molecular weight anion portion of the acid will be exchanged with the anion resin in an insignificant amount thereby leaving the anion resin in the hydroxyl form. At this stage both resins have ferrous hydroxide precipitated within their pores and thus they are ready for both demineralization and oxygen removal. The reactions involved in the service cycle for each of the resins with water containing calcium and chlorine ions plus dissolved oxygen are as follows.

(6) Cation resin:

$$2RH + 4Fe(OH)_2 + Ca^{++} + O_2 + 2H_2O \rightarrow R_2Ca$$
$$+ R_2Ca + 4Fe(OH)_3 + 2H^+$$

(7) Anion resin:

$$2ROH + 4Fe(OH)_2 + 2Cl^- + O_2 + 2H_2O \rightarrow 2RCl$$
$$+ 4Fe(OH)_3 + 2OH$$

Upon exhaustion of the resins sulphuric acid is passed downwardly through the column to remove the ferric hydroxide from each of the resins and to convert the cation resin to the hydrogen form. The reactions involved in this step are as follows.

(8) Cation resin:

$$R_2Ca + 2Fe(OH)_3 + 4H_2SO_4 \rightarrow 2RH$$
$$+ Fe_2(SO_4)_3 + CaSO_4 + 6H_2O$$

(9) Anion resin:

$$2RCl + 2Fe(OH)_3 + 4H_2SO_4 \rightarrow R_2SO_4$$
$$+ Fe_2(SO_4)_3 + 2HCl + 6H_2O$$

At this stage the resins may be separated by the use of a backwash as was described in conjunction with the regeneration of column 34. This separation is for the purpose of isolating the anion resin so that it may be converted from the sulfate form to the hydroxyl form by flowing sodium hydroxide downwardly through the top anion resin layer while passing water upwardly through the cation resin. The cation and anion resins are now in the hydrogen and hydroxyl forms, respectively, and thus ready for demineralization service or for reactivation for oxygen removal as desired.

Instead of separating the resins prior to this latter treatment with sodium hydroxide, the mixed resins may be treated with sodium hydroxide which will convert the cation resin to the sodium form as well as convert the anion resin to the hydroxyl form. Thereafter, the cation resin may be converted back to the hydrogen form with ligninsulphonic acid without separating the resins.

Provisions for activation of the resins for oxygen removal has only been illustrated for column 36 of FIG. 2. It is obvious, however, that similar provisions could be made for column 34 so that the columns could be alternately used for oxygen removal as well as for demineralization.

The arrangement shown in FIG. 3 applies the principles of the present invention to conventional 2-step demineralizers wherein each column contains only a cation or anion resin whereas the arrangement shown in FIG. 2 employed a mixed bed column. Although various arrangements of the separate bed system are possible, the arrangement of FIG. 3 employs one pair of ion exchange units for oxygen removal while the other pair is employed to demineralize the deoxygenated water. Columns 76 and 78 are cation and anion columns, respectively, and each is provided with oxygen removal activating systems. These two columns 76 and 78 when not utilized for oxygen removal are employed alternately with columns 80 and 82 for demineralization. When column 76 is activated for oxygen removal the resin therein is in the sodium form and thus will not remove cations from the incoming water. Likewise, the resin in column 78 is in the sulfate form and will not remove anions from the water. Therefore, the water leaving column 78 is fed via line 84 to columns 80 and 82 wherein the water is demineralized in a conventional manner. An alternative to this arrangement would be to convert the resin in column 76 to the hydrogen form with ligninsulphonic acid and to convert the resin in column 78 to the hydroxyl form with further sodium hydroxide treatment in which case the water would be both deoxygenated and demineralized after passing through the units 76 and 78. The water could then be fed directly to the boiler without passing through columns 80 and 82.

The operation of the demineralizing-deoxygenating systems described when used in conjunction with the deaerator in a vapor generating circuit is as set forth below. Prior to start-up of the furnace the demineralizing system is activated for oxygen removal. This accomplished by the methods previously described such that column 36 or columns 76 and 78, depending upon the particular system employed, are activated for oxygen removal. Upon start-up the feedwater is routed through the activated column or columns and then fed through the low pressure feedwater heater 26. The water may then either pass through the inactive deaerator to the feed pump or bypass the deaerator through the valved line 86. The valves which control the steam flow to line 29 are all closed during this initial stage of operation. As steam becomes available, at point 88 for instance, and as the oxygen removal power of the activated resin is depleted, steam is admitted to the deaerator and the feedwater is routed therethrough. The deaerator is now serving to deoxygenate the feedwater and this function of the demineralizing system is no longer needed. Therefore, the feedwater is re-routed from the activated column or columns to the other columns, for conventional demineralizing treatment. The columns which were activated for oxygen removal are treated in the manner previously described to remove the spent deoxygenating materials from the resin and to prepare the resin for subsequent use as an alternate or standby demineralizer.

It can be seen that such a system involves very little capital expenditure as compared with the cost of providing an auxiliary steam source. All that is necessary in the system of the present invention over and above that normally required for a demineralizing system is the supply tanks for the additional activating materials and the additional piping and valves associated therewith.

While several embodiments of the invention have been shown and described it will be understood that such showings are illustrative rather than restrictive and that changes in construction and arrangement of parts and in the steps involved may be made without departing from the spirit and scope of the invention as claimed.

We claim:

1. The method of operating an ion exchange unit containing cation exchange material comprising the steps of treating said material with a metallic salt to convert said material to a metallic form, treating said metallic form of the material with alkali to precipitate metallic hydroxide within the pores of the material, treating the resulting material with a high molecular weigh acid, the anion portion of said acid being of such a size that it will not enter the pores of said resulting material and therefore will not react with said metallic hydroxide, said acid converting said resulting material to the hydrogen form and thereafter passing water in contact with said hydrogen form of the said resulting material to remove cations and oxygen from said water.

2. The method of claim 1 wherein said metallic salt is selected from the group consisting of ferrous and manganous sulfate and said high molecular weight acid is selected from the group consisting of ligninsulphonic acid and pectic acid.

3. The method of operating a mixed bed ion exchange unit containing cation and anion exchange material comprising the steps of treating said material with a metallic salt to convert said cation exchange material to the metallic form and to convert said anion exchange material to the salt form and to precipitate metallic hydroxide within the pores of said converted anion exchange material, treating said converted material with a hydroxide to precipitate metallic hydroxide within the pores of said converted cation material and to reconvert said converted anion material from said salt form to the hydroxyl form, treating the resulting material with an acid to reconvert said converted cation exchange material to the hydrogen form, said acid having a high molecular weight such that the anion portion thereof is of such size so as to be unable to enter the pores in said resulting material and unable to react with said precipitated metallic hydroxide, and thereafter passing water in contact with the thus treated material to remove oxygen and ions therefrom.

4. The method of claim 3 wherein said acid is selected from the group consisting of ligninsulphonic acid and pectic acid and said metallic salt is selected from the group consisting of ferrous manganous sulfate.

5. The method of feedwater treatment for a steam generating system wherein said system includes a steam generator, a steam operated deaerator, and an ion exchange system containing ion exchange material comprising the steps of activating at least a portion of said ion exchange material for the removal of dissolved gases from said feedwater and placing at least a portion of said ion exchange material in the hydrogen form for cation removal, passing feedwater in contact with said activated portion and said portion in the hydrogen form to remove both cations and dissolved gases from said feedwater when steam is unavailable for said steam operated deaerator, treating said feedwater in said deaerator for the removal of dissolved gases when steam is available and thereafter treating said feedwater in said ion exchange system for the removal of ions.

6. The method of claim 5 wherein said activated portion and said portion in the hydrogen form are the same and wherein said portions simultaneously remove ions and dissolved gases.

7. A feedwater system for a steam generating unit comprising in combination, a steam operated deaerator, means for supplying steam to said deaerator from said steam generating unit, an ion exchange system, means for feeding water to said steam generating unit through said ion exchange system and said deaerator, said ion exchange system including cation exchange material, means for contacting said material with a metallic salt selected from the group consisting of ferrous and manganous salts to convert said material to the metallic form, means for contacting the metallic form of said material with an alkali to precipitate metallic hydroxide within the pores of said treated cation exchange material and means for contacting said treated cation exchange material with a high molecular weight acid which will convert said treated cation exchange material to the hydrogen form without reacting significantly with said precipitated metallic hydroxide whereby said precipitated metallic hydroxide will be available for removing oxygen from said water and whereby said treated cation exchange material in the hydrogen form will be available for removing cations from said water.

8. A feedwater system for a steam generating unit comprising in combination, a steam operated deaerator, means for supplying steam to said deaerator from said generating unit, an ion exchange system, means for feeding water to said steam generating unit through said ion exchange system and said deaerator, said ion exchange system including cation exchange material, means for activating said material for the removal of dissolved gases from said feedwater, means for converting said material to the hydrogen form while it is still activated for gas removal whereby said material may simultaneously remove gases and cations from said water when steam is not available for said steam operated deaerator.

References Cited by the Examiner
UNITED STATES PATENTS

| 2,710,255 | 6/1955 | Van Blaricom et al. | 210—34 |
| 3,183,184 | 5/1965 | Fisher | 210—26 |
| 3,183,185 | 5/1965 | Haagen | 210—26 |
| 3,210,912 | 10/1965 | Peake et al. | 55—39 |

OTHER REFERENCES

Betz Handbook of Industrial Water Conditioning, Betz Laboratories, Inc., Philadelphia, Pa., copyright 1957, pages 26 and 52 relied upon.

MORRIS O. WOLK, *Primary Examiner.*

E. G. WHITBY, *Assistant Examiner.*